(12) United States Patent
Simon et al.

(10) Patent No.: US 7,126,437 B2
(45) Date of Patent: Oct. 24, 2006

(54) BUS SIGNALING THROUGH ELECTROMAGNETIC COUPLERS HAVING DIFFERENT COUPLING STRENGTHS AT DIFFERENT LOCATIONS

(75) Inventors: Thomas D. Simon, Marlborough, MA (US); Rajeevan Amirtharajah, Providence, RI (US); John R. Benham, Westborough, MA (US)

(73) Assignee: Intel Corporation, Santa Clara, CA (US)

(*) Notice: Subject to any disclaimer, the term of this patent is extended or adjusted under 35 U.S.C. 154(b) by 87 days.

(21) Appl. No.: 10/165,096

(22) Filed: Jun. 5, 2002

(65) Prior Publication Data

US 2003/0227346 A1 Dec. 11, 2003

(51) Int. Cl.
*H01P 5/04* (2006.01)
(52) U.S. Cl. ............................. 333/24 R; 333/109
(58) Field of Classification Search ........... 333/24 R, 333/109, 111, 116; 710/100
See application file for complete search history.

(56) References Cited

U.S. PATENT DOCUMENTS

| | | | |
|---|---|---|---|
| 3,516,065 A | 6/1970 | Bolt et al. | |
| 3,619,504 A | 11/1971 | De Veer Olney et al. | |
| 3,673,548 A | 6/1972 | Mattingly et al. | |
| 5,192,832 A | 3/1993 | Rudy, Jr. et al. | |
| 5,363,071 A * | 11/1994 | Schwent et al. | 333/111 |
| 5,432,486 A | 7/1995 | Wong | |
| 5,638,402 A | 6/1997 | Osaka et al. | |
| 5,958,030 A | 9/1999 | Kwa | |
| 6,111,476 A * | 8/2000 | Williamson | 333/109 |
| 6,163,464 A | 12/2000 | Ishibashi et al. | |
| 6,335,662 B1 * | 1/2002 | Del Rosario et al. | 333/111 |
| 6,399,898 B1 | 6/2002 | Kwong et al. | |
| 6,434,647 B1 | 8/2002 | Bittner, Jr. | |
| 6,438,012 B1 | 8/2002 | Osaka et al. | |
| 6,498,305 B1 | 12/2002 | Marketkar et al. | |
| 6,573,801 B1 | 6/2003 | Benham et al. | |
| 6,576,847 B1 * | 6/2003 | Marketkar et al. | 174/255 |
| 6,625,682 B1 | 9/2003 | Simon et al. | |
| 6,705,898 B1 | 3/2004 | Pechstein et al. | |
| 6,882,239 B1 | 4/2005 | Miller | |
| 2001/0024888 A1 | 9/2001 | Marketkar et al. | |
| 2001/0053187 A1 | 12/2001 | Simon et al. | |
| 2002/0018526 A1 | 2/2002 | Osaka et al. | |
| 2003/0150642 A1 | 8/2003 | Wu et al. | |
| 2003/0152153 A1 | 8/2003 | Simon et al. | |
| 2003/0227347 A1 | 12/2003 | Simon et al. | |
| 2003/0236005 A1 | 12/2003 | Wu et al. | |

FOREIGN PATENT DOCUMENTS

WO  WO 00/72163 A1  11/2000

OTHER PUBLICATIONS

PCT Search Report dated Sep. 16, 2003.
PCT Search Report dated Jun. 9, 2004.

* cited by examiner

*Primary Examiner*—Benny Lee
(74) *Attorney, Agent, or Firm*—Philip A. Pedigo

(57) ABSTRACT

Electromagnetic coupling locations are provided along a bus. Devices can be respectively coupled at the locations for communication on the bus. Electromagnetic coupling strengths associated with at least some coupling locations are caused to have different, selected values.

15 Claims, 2 Drawing Sheets

BUS SIGNALING THROUGH ELECTROMAGNETIC COUPLERS HAVING DIFFERENT COUPLING STRENGTHS AT DIFFERENT LOCATIONS

Electromagnetic couplers can be used, for example, to couple data between electronic devices and a communication bus (e.g., a multi-drop bus) in place of more conventional direct electrical connections. Such an arrangement is proposed in U.S. Pat. No. 5,638,402.

An electronic device that communicates data on a bus sends or receives the data in the form of an electrical signal that conforms to a predefined signaling specification. In recovering the data from the received signal, the receiving device assumes that the signal conformed to the specification when it was sent.

Each of the figures illustrates features and elements of only some implementations. Other implementations are also within the scope of the claims.

Figure 5:
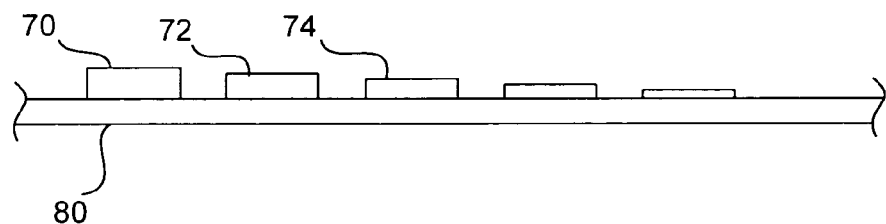
Figure 6:
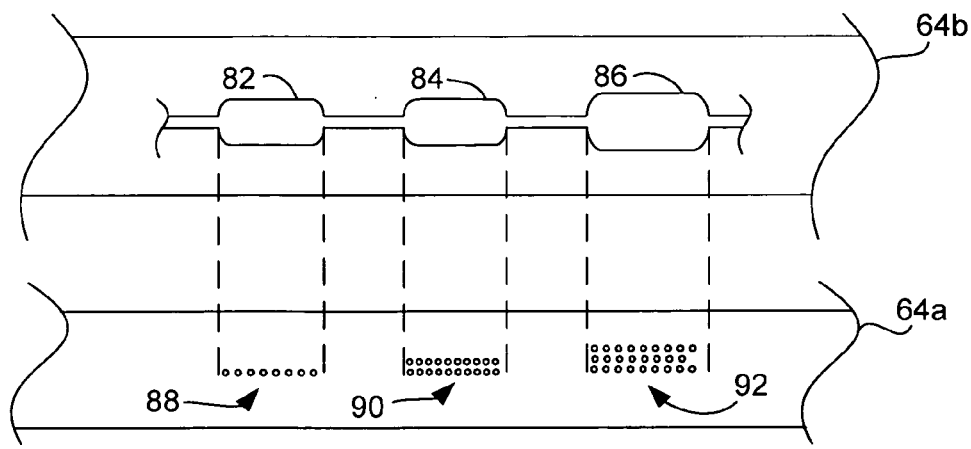

FIGS. 5 and 6, respectively, show a side view and a top view of a portion of a bus.

DETAILED DESCRIPTION OF THE INVENTION.

Figure 1:
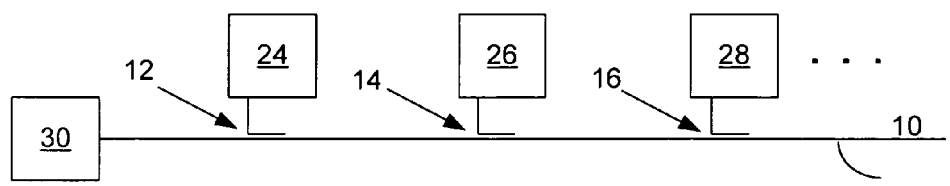
FIG. 1 shows a schematic view of a prior art bus.

As shown in FIG. 1, in one prior art approach to implementing a high-speed multi-drop bus 10 using electromagnetic couplings 12, 14, 16, the coupling strengths of the couplings between the bus and the communicating devices 24, 26, 28 (also referred to in this description as drop-off points 24, 26, 28) may all be controlled to be uniformly within a targeted range. One way to control the coupling strengths to be uniform is to impose tight manufacturing tolerances on the dimensions and properties of dielectric materials associated with the couplings. Another is to use zigzag coupler geometries that reduce the impact on coupling strength due to variations in the geometric precision of the coupling arrangements. Zigzag coupling arrangements are described in U.S. Pat. No. 6,573,801.

Controlling coupling strengths to fall uniformly within a particular range achieves a compromise between competing constraints. Excessive coupler strengths cause large impedance disturbances along the bus, thereby degrading signal integrity. High coupler strengths also divert too much signal energy into drop-off points 24 that are closer to the bus master 30, leaving little energy to divert to distant drop-off points 28. On the other hand, insufficient coupler strength causes even the nearest drop-off points to receive or impart too little energy from or to the bus.

By using, along the bus, couplers that have deliberately non-uniform coupling strengths, bandwidth can be improved and costs reduced.

It is useful to arrange for each device along the bus to receive the same amount of energy as any of the other devices along the bus. The amount of energy received by a device depends on both the coupling strength and the amount of energy available on the bus at the point of coupling.

Figure 2:
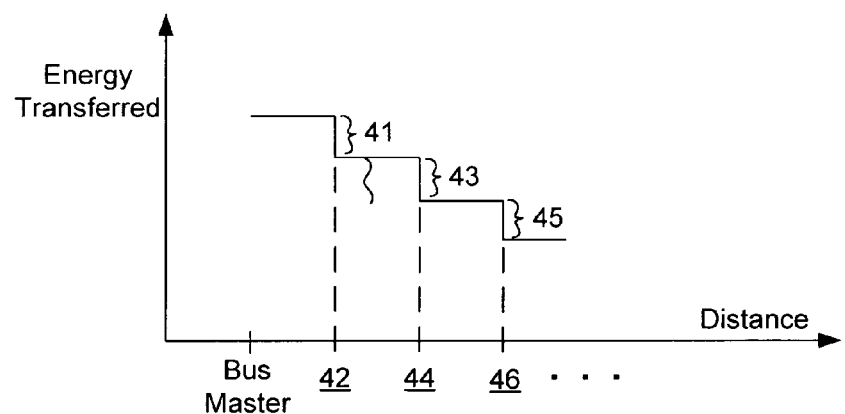
FIG. 2 shows a graph of coupling strength.

As shown in FIG. 2, each coupler 42, 44, 46 along the length of the bus (shown conceptually as a vertical dashed line at its location along the bus) respectively drains an amount of energy 41, 43, 45 from the bus. The energy drained by the coupler 42, for example, leaves a smaller remaining amount of energy 47 to reach the next coupler 44 farther from the bus master. Because the amount of energy on the bus at the coupling location of the next coupler, e.g., coupler 44, is lower, the coupling strength must be higher for coupler 44 to drain the same energy 43 as was drained by the prior coupler 42. The higher coupling strength of coupler 44 is tolerable because there are fewer downstream couplers that need to draw energy from the bus than was the case for coupler 42. Conversely, weaker earlier couplers are tolerable because the full signal energy is available for them to sample, while the fact that they drain less energy benefits later couplers.

Figure 3:
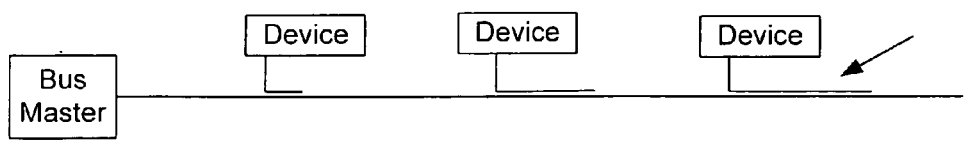
FIG. 3 shows a schematic view of a bus.

In the example of FIG. 3, couplers 91, 92, 93 having non-uniform coupling strengths occupy respective coupling locations along a bus 90. The coupler 91 is at the coupling location closest to a bus master 97 and the coupler 93 is at the coupling location furthest from the bus master 97. Devices 94, 95, 96 are respectively coupled to the coupling locations for communication on the bus 90. The relative coupling strengths of the couplers 91, 92, 93 are shown symbolically in FIG. 3 by drawn lines. Couplers drawn using longer lines, e.g., coupler 93 represent stronger coupling strengths, although physical dimensions are only one way of achieving this. Other examples include material properties of the coupler, for example, permittivity and permeability and the extent of the coupler along all three dimensions. The configuration of the traces may also be controlled (patterned). For example, besides zig-zags, perforated ground planes and other implementations may be used.

Using different coupler strengths along the bus reduces the cost associated with tight manufacturing tolerances, because couplers having a range of different strengths become useful. Yield increases and cost is reduced.

A variety of mechanisms may be used for introducing and utilizing non-uniform coupler strengths for multi-drop electromagnetically coupled buses.

In the case of variations due to the manufacturing of the couplers, the non-uniformity already exists. Mechanisms such as color coding or physical keying may be used to label or target different coupler strengths for different bus positions. A wider range of coupling strength may be tolerable in manufacturing if, after testing, weak couplers are marked or keyed for near bus positions and strong ones for far positions.

Figure 4:
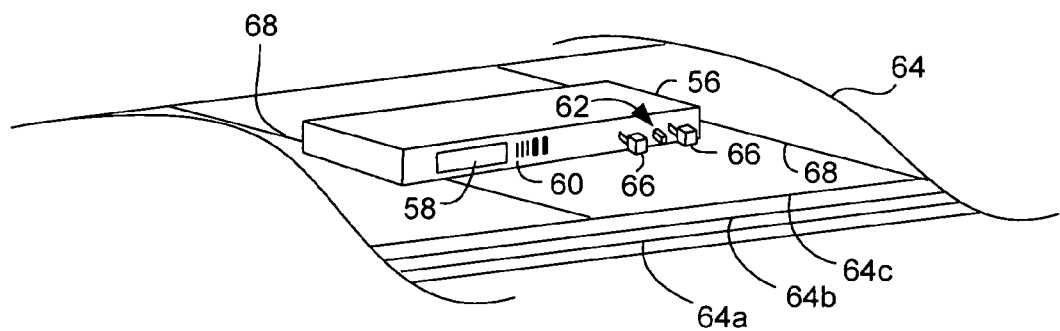
FIG. 4 shows a coupler on a bus.

In implementations in which manufacturing tolerances are relaxed and coupling strengths are allowed to vary more widely than would otherwise be the case, the finished couplers may be tested (e.g., by measuring the coupling strength of each coupler) and sorted by coupling strength. As shown in FIG. 4, the relative coupling strengths of the couplers may be indicated by marking the couplers 56 with color 58 or symbols (e.g., bar code 60) or other indicia or devices. Any device or technique can be used which assures that couplers of the intended strength occupy intended positions along the bus.

In some cases, the system may rely on human installation in the right position based on color. In other cases, the placing of the couplers may be effected by robotic systems that could "read" color indications or bar codes or other information marked on the couplers.

In addition, appropriate positioning of the various couplers may be enforced by providing different keyed mechanical features 62 on the couplers that correspond to the different coupling strengths. The motherboard 64 may then be constructed to have corresponding features 66 to accept only a particular coupler key at each position along the bus 68.

Aside from taking advantage of the natural variation in size and other parameters resulting from broad manufacturing tolerances, variations in coupler strength may be achieved more deliberately, for example, by controlling dielectric thicknesses, dielectric constants, and the number of zigzag geometry crossover points on the coupling traces of the bus and the coupler. The choice among possible mechanisms could be based on cost. For example, if the cost of engineering and manufacturing multiple categories of modules to be attached to the bus is a concern, the system may use uniform daughter cards and make alterations only to parameters of the motherboards that affect the coupling strengths at various points along the bus.

As shown in FIG. 5 (which is not to scale), variations of motherboards may include dielectric spacers 70, 72, 74 of different heights glued to the motherboard 80 at the locations of drop-off points along the bus. Or the widths of motherboard coupling traces 80, 82, 84 may be different at different coupler locations, as shown on FIG. 6 (also not to scale).

Wider traces would yield stronger coupling for couplers that are farther away from the bus controller. Wider traces could use either different categories of daughter cards (if the trace width variations were to be provided on the daughter cards rather than on the motherboard) or adjustment of the trace widths on the motherboard.

Referring to FIGS. 4 and 6, the variation in impedance of the motherboard traces 82, 84, 86 (see FIG. 6) in an internal plane 64b within the motherboard 64 (resulting from different trace widths at different coupling locations along the bus) could be offset, if desired, by configuring another internal plane 64a, e.g., by progressive cross hatching. In one example, the cross-hatching is in the form of a pattern of holes 88, 90, 92 in the ground plane 64a of the motherboard 64 as best seen in FIG. 6. The removal of metal changes the impedance, because the field lines terminate in different patterns than for continuous metal. More cross hatching may be provided under wider traces. The cross-hatching maintains the average overlap between the trace and the ground plane, which factors into the trace impedance, thus removing any unwanted correlation between the strength of a coupler and its standalone impedance to its own ground plane.

Although we have described and shown some implementations of the invention as examples, other implementations of features and combinations of features are also within the scope of the following claims.

For example, there may be applications in which it is useful to arrange the different couplers in an order such that the coupling strengths rise and/or fall other than monotonically with distance along the bus.

The invention claimed is:

1. Apparatus comprising
an electromagnetic bus coupler bearing indicia representative of a parameter associated with coupling strength.

2. The apparatus of claim 1 in which the indicia comprises color.

3. The apparatus of claim 1 in which the indicia comprises a bar code.

4. The apparatus of claim 1 in which the indicia comprises a mechanical key.

5. A system comprising
a circuit board bearing a bus, and
at three or more coupling locations along the bus, coupling elements having respectively different coupling strengths for coupling with the bus, the coupling elements comprising one or more of the following: dielectric spacers of different heights and coupling elements of different material properties.

6. The system of claim 5 in which the coupling elements are affixed to the circuit board.

7. The system of claim 5 in which the different material properties of the coupling elements comprise one or more of the following: permittivity of a coupling element and permeability of a coupling element.

8. The system of claim 5 in which the elements comprise dielectric spacers.

9. A method comprising
manufacturing electromagnetic bus coupling elements having uncontrolled manufacturing variations associated with coupling strength, and
sorting the coupling elements in accordance with the respective coupling strengths of the coupling elements within a tolerance range.

10. The method of claim 9 also comprising
marking each of the coupling elements with indicia associated with its coupling strength.

11. The method of claim 9 also comprising
using the coupling elements to achieve selected coupling strengths at respective locations along a bus.

12. A method comprising
providing electromagnetic coupling locations along a bus at which devices can be respectively coupled for communication on the bus,
measuring electromagnetic coupling strengths of couplers to be used at the coupling locations, and
causing electromagnetic coupling strengths associated with at least some coupling locations to have different, measured values, such that essentially equal amounts of energy are drained from the bus at the respective coupling locations.

13. A system comprising
a circuit board bearing a bus, and
at coupling locations along the bus, coupling elements associated with different measured coupling strengths for coupling with the bus, such that essentially equal amounts of energy are drained from the bus at the respective coupling locations, the coupling elements comprising one or more of the following: dielectric spacers of different heights and coupling elements of different material properties.

14. A motherboard comprising
a bus, and
at locations along the bus coupling elements having different strengths of coupling with communicating devices, such that essentially equal amounts of energy are drained from the bus at the respective coupling locations, the coupling elements comprising one or more of the following: coupling traces of different trace widths and coupling traces of different configuration patterns.

15. A method comprising:
measuring electromagnetic coupling strength of couplers to be used at three or more coupling locations along a bus at which devices can be respectively coupled for communication on the bus; and
making couplers having different measured electromagnetic coupling strengths for mounting in at least three of the coupling locations.

* * * * *